(12) United States Patent
Venosa et al.

(10) Patent No.: US 6,821,425 B2
(45) Date of Patent: Nov. 23, 2004

(54) BIOMASS CONCENTRATOR REACTOR

(75) Inventors: Albert D. Venosa, Cincinnati, OH (US); Makram T. Suidan, Cincinnati, OH (US)

(73) Assignee: U.S. Environmental Protection Agency, Washington, DC (US)

( * ) Notice: Subject to any disclaimer, the term of this patent is extended or adjusted under 35 U.S.C. 154(b) by 0 days.

(21) Appl. No.: 10/358,260

(22) Filed: Feb. 5, 2003

(65) Prior Publication Data
US 2003/0146152 A1 Aug. 7, 2003

Related U.S. Application Data
(60) Provisional application No. 60/354,257, filed on Feb. 6, 2002.

(51) Int. Cl.[7] .................................................. C02F 3/00
(52) U.S. Cl. .................... 210/615; 210/620; 210/151; 210/346
(58) Field of Search ............................... 210/615, 620, 210/150, 151, 220, 346, 461, 617

(56) References Cited

U.S. PATENT DOCUMENTS

| | | | | |
|---|---|---|---|---|
| 699,345 A | * | 5/1902 | Provost, Jr. .................. 210/151 |
| 2,830,947 A | * | 4/1958 | Griffith ........................ 210/615 |
| 3,543,294 A | * | 11/1970 | Boester ....................... 210/620 |
| 3,575,850 A | * | 4/1971 | Dauidlum et al. ........... 210/220 |
| 3,764,525 A | * | 10/1973 | Goodman et al. ........... 210/615 |
| 3,835,039 A | * | 9/1974 | Ciambrone ................... 210/615 |
| 3,923,656 A | * | 12/1975 | Krebs et al. ................. 210/220 |
| 4,090,965 A | * | 5/1978 | Fuchs .......................... 210/151 |
| 4,246,114 A | * | 1/1981 | Krebs et al. ................. 210/220 |
| 4,705,634 A | * | 11/1987 | Reimann et al. ............ 210/151 |
| 5,578,202 A | * | 11/1996 | Hirane ........................ 210/150 |
| 5,741,417 A | * | 4/1998 | Patzig et al. ................ 210/220 |
| 6,015,490 A | * | 1/2000 | Katsukura et al. .......... 210/151 |
| 6,331,249 B1 | * | 12/2001 | Nelson et al. .............. 210/151 |

* cited by examiner

Primary Examiner—Christopher Upton
(74) Attorney, Agent, or Firm—Browdy and Neimark, P.L.L.C.

(57) ABSTRACT

A gravity-flow Biomass Concentrator Reactor (BCR) is provided which uses a porous barrier having pore sizes averaging from about 1 to about 50 microns through which treated water permeates under the pressure of gravity. Solids suspended in water treated with the BCR are effectively retained and concentrated.

12 Claims, 3 Drawing Sheets

BIOMASS CONCENTRATOR REACTOR

CROSS-REFERENCE TO RELATED APPLICATIONS

The present application claims priority from provisional application Ser. No. 60/354,257, filed Feb. 6, 2002, the entire contents of which are hereby incorporated by reference.

FIELD OF THE INVENTION

The present invention relates to a reactor for biological treatment of water, including drinking water, municipal and industrial wastewater, and hazardous waste.

BACKGROUND OF THE INVENTION

Water quality is of increasing importance, as many of the impurities in water have been identified to have deleterious effect in the environment or for plant or animal life. Both water from streams, rivers, etc. and wastewater require treatment to reduce the pollutants in the water to acceptable levels.

Wastewater emanates from four primary sources: municipal sewage, industrial wastewaters, agricultural runoff, and storm water and urban runoff. For purposes of the present invention, the term "wastewater" will include water from any or all of these sources.

Wastewater can be purified by a variety of methods, including mechanical purification by sedimentation or filtration (usually surface waters for drinking water treatment), and chemical purification by, for example, the addition of ozone or chlorine (not practical as standalone for wastewater treatment). Biological wastewater treatment is by far the most widely used technology for treating municipal and industrial wastewater in the U.S., and it is gaining popularity for the treatment of drinking water.

Biological treatment of water and wastewater requires an intimate contact between microbes and the water being treated and establishment of an environment conducive to the growth of the microorganisms utilizing the contaminants in the water. For efficient utilization of space and effective treatment, these processes typically concentrate the microbes either by using a settling tank or attaching the microbes to fixed surfaces from which biomass solids may slough. The settling tank is used both to concentrate the biomass for recycling back to the aeration tank and for separation (clarification) of the biomass from the effluent prior to discharge.

More recently, membrane technology has been used for biomass concentration and separation from the treated water. These devices, typically referred to as membrane bioreactors (MBRs), achieve biomass separation using either polymeric or ceramic membranes. The membranes can be either located within the bioreactor or placed external to the bioreactor. When placed within the bioreactor, these units are operated either by applying a partial vacuum on the permeate side of the membrane or by applying pressure to the mixed liquor (biomass) side of the reactor. When the membrane is placed external to the aeration chamber, mixed liquor is pumped at a high flow rate or pressure across this external membrane to achieve separation.

Problems associated with conventional treatment systems are the loss of solids in the treated effluent and the frequent failure of settling tanks to deliver clarified effluents that meet discharge limitations. Conventional membrane bioreactors rely on pressure or vacuum to achieve liquid flux and solids separation. Although MBRs deliver excellent effluent quality, MBRs suffer from high capital and operating costs.

SUMMARY OF THE INVENTION

It is an object of the present invention to overcome deficiencies in the prior art.

It is another object of the present invention to provide a gravity-flow biomass concentrator reactor.

It is a further object of the present invention to provide a gravity-flow biomass concentrator reactor which effectively retains and concentrates suspended solids from the water treated therewith.

It is still another object of the present invention to provide a gravity-flow biomass concentrator reactor that can be used under either aerobic or anaerobic conditions.

According to the present invention, a gravity-flow Biomass Concentrator Reactor (BCR) is provided which comprises a porous barrier having pore sizes averaging from about 1 to about 50 microns through which treated water permeates under the pressure of gravity. Solids suspended in water treated with the BCR are effectively retained and concentrated on one side of the barrier.

The gravity-flow Biomass Concentrator Reactor comprises a vessel for holding at least one porous barrier, an inlet for water to be treated such that water flows by gravity through the porous barrier, and an outlet for treated water.

The porous material used in the BCR can be of modular design with the size and number of modules dependent on the flow to be treated, or it can be one large continuous monolith. The porous material used in the BCR can be any suitable porous material. To date, only porous polyethylene walls have been used, although other materials that serve the same function can be substituted for the porous polyethylene. Examples of such other materials include polymeric or ceramic membranes, synthetic or natural woven cloth materials, etc.

The BCR is operated by directing contaminated water into the reactor and allowing microorganisms to biodegrade the contaminants in the water. The treated water permeates through the porous walls of the reactor under the force of gravity while the biomass is retained within the reaction space. This is conceptually similar to currently utilized MBRs except that selection of the pore size of the porous walls allows for gravity flow of the treated water through the porous wall. Selection of the proper pore size can permit continued operation of the system without the need for maintenance above and beyond what is practiced currently with MBRs.

The porous wall provides the separation between the biologically active treatment side and the product water collection parts of the reactor. When operated under aerobic conditions, the biologically active side is mixed by simple diffused air aeration with or without the assistance of water recycling. When the BCR is operated under anaerobic conditions, water recycling or mechanical mixing provide the intimate contact needed between the microorganisms and contaminants. Recycling can be achieved by pumping water at a high flow rate from the tail end of the reactor to the head end, while mechanical mixing could be provided via many of the available mixing devices currently used in anaerobic digestion. No other differences exist when operating under anaerobic conditions.

DETAILED DESCRIPTION OF THE INVENTION

Figure 1:
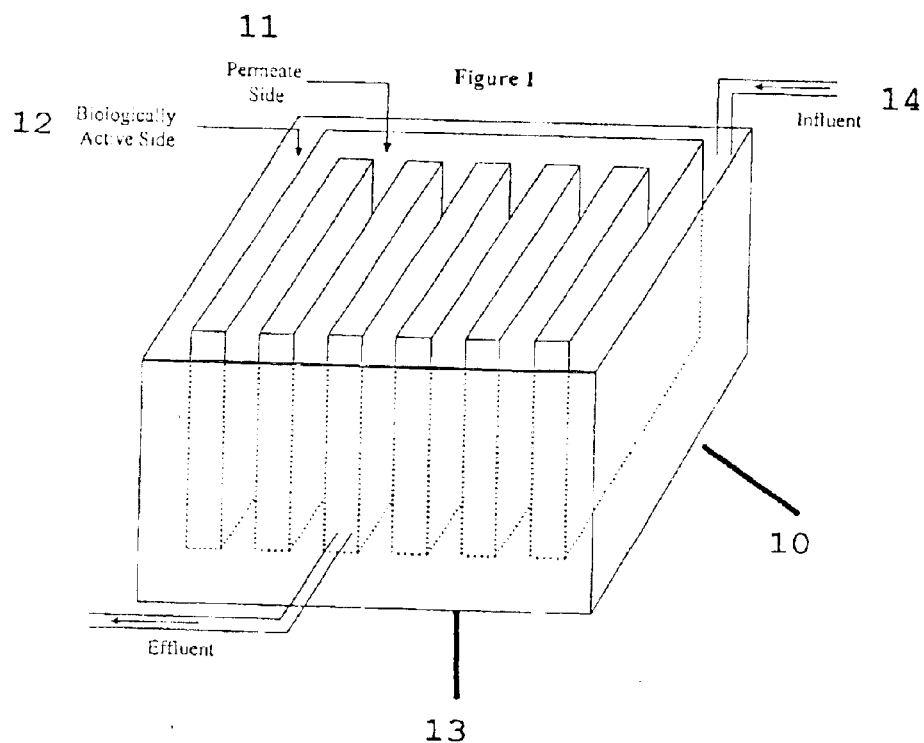
FIG. 1 illustrates one configuration of a gravity-flow biomass concentration reactor.

The biomass concentrator reactor of the present invention is a gravity flow-through system, as opposed to a conventional pressure or vacuum system. The advantage of the biomass concentrator reactor of the present invention is the use of gravity flow, which makes possible operational simplicity and significantly reduced operation and maintenance costs. The capital cost of equipment is very low because there is no need for pressurization. Biological treatment of any contaminated liquid stream is greatly facilitated by maintenance of a long sludge age and retention of a high biomass solids content.

Conventional activated sludge systems cannot retain the high solids content that the gravity-flow biomass concentrator reactor can, because the BCR relies upon a permeable surface gravity to achieve separation of settlable but light solids from flowing liquid while the liquid flow is driven by gravity. Conventional activated sludge systems which use gravity settling tanks effect approximately 99% solids separation. This usually results in effluent quality barely meeting discharge standards for suspended solids. Any upset to the performance of the settling tank results in failure to meet the discharge standards, a very common occurrence in municipal wastewater treatment. However, the biomass concentrator reactor of the present invention effects 99.98+% solids separation, thus providing effective treatment without the problems associated with conventional treatment. Additionally, the fact that solids separation is virtually complete allows for total control of the retention time in the system.

The ability to effectively retain biomass in the gravity-flow biomass concentrator reactor allows for the buildup of high levels of biomass in the aeration tank. This is a very important advantage of the gravity-flow biomass concentrator reactor in terms of handling fluctuations in flow rates and wastewater composition. The biomass retaining property of the gravity-flow biomass concentrator reactor offers a special advantage in systems in which biomass yield (mass of biosolids produced per mass of substrate consumed) is low, such as in toxic groundwater containing MTBE or leachate containing compounds that might be toxic to degrading populations.

Sludge age or solids retention time (SRT) is a term used to describe the diversity of culture in a biological reactor. SRT is equivalent to the doubling time of the slowest growing organisms that can survive in the biological reactor. Increases in sludge age lead to increased diversity of the biological culture as well as increases in the total concentration of biomass in the reactor.

The biomass concentrator reactor allows total control of the SRT. This is because any wastage of biomass from the reactor is effected intentionally, unlike conventional systems that use settling tanks for solids/water separation because of their incomplete ability to control the concentration of solids leaving the reactor in the clarified water. A good example of the advantage of the intentional wastage of biomass from the BCR as compared to conventional treatment systems is reflected in the BCR's ability to effect highly efficient MTBE destruction (see FIG. 3) while a fluidized bed system that permits biomass to leave uncontrollably in the effluent was unable to effect equal or comparable removal (see FIG. 4). Furthermore, a settling tank could itself serve as a selector, encouraging the accumulation of organisms that flocculate and settle. The gravity-flow biomass concentrator reactor does not discriminate among organisms based upon their ability to flocculate. It also does not suffer from excessive growth of filamentous organisms that typically plague conventional biological treatment systems.

The biomass concentrator reactor achieves the same end results as membrane bioreactors in terms of contaminant treatment, achieving high quality effluents. Commercially available membrane bioreactors use either ceramic or polymeric membranes to retain biomass. These membranes can be located within the biological reactor or external to it. The process of the present invention offers the same advantages as commercially available systems, without requiring external pressure or vacuum to drive the treated water across the membrane. Consequently, water treatment using the BCR of the present invention is more economical and at least equally as effective in treating contaminated waters as compared to the commercial units currently in use.

Figure 2:
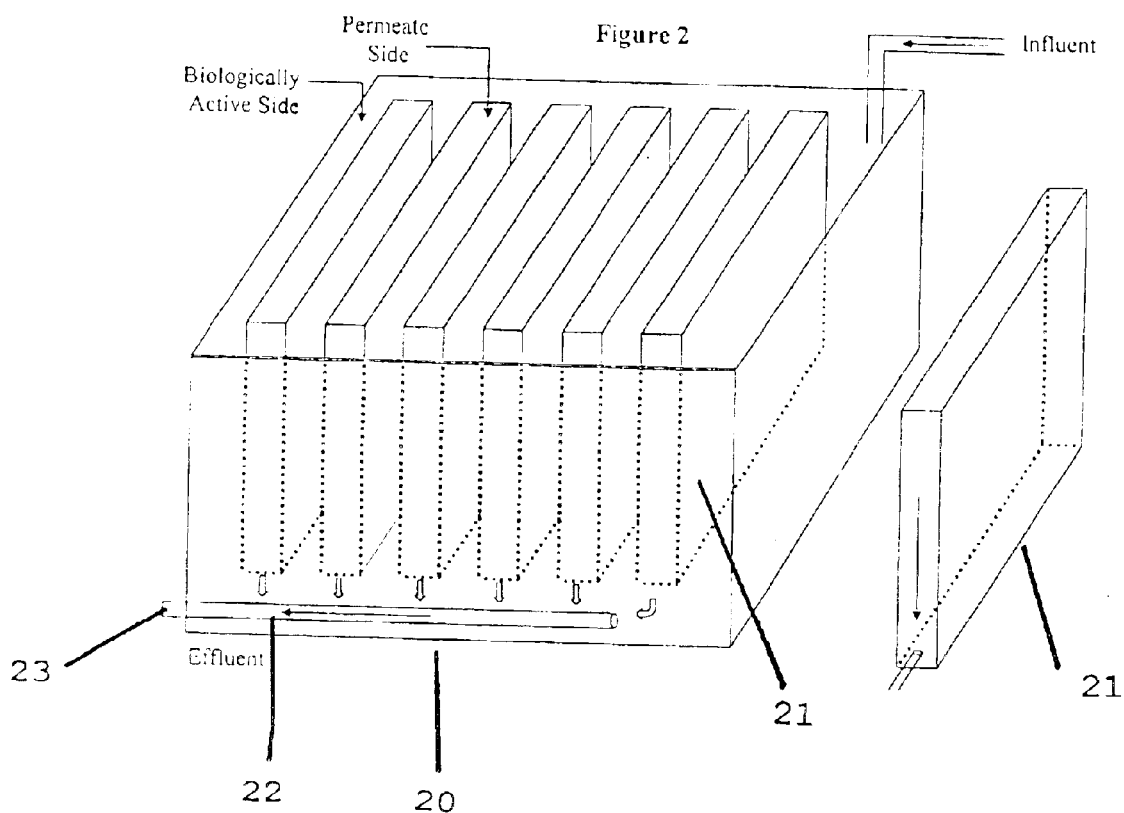
FIG. 2 illustrates another configuration for use with a gravity-flow biomass concentration reactor.

FIGS. 1 and 2 illustrate two of numerous possible configurations of a biomass concentrator reactor according to the present invention. In all possible BCR configurations, the surface area of the porous walls per unit volume of reactor is maximized. Maximization of the surface area of the porous walls per unit volume of reactor can be achieved by stacking a plurality of modules of the porous wall adjacent to each other or by using a fin design that maximizes surface area. This will allow use of a short hydraulic residence time (HRT) and, consequently, a smaller reactor footprint.

FIG. 1 illustrates one possible embodiment of a biomass concentrator reactor 10 according to the present invention, which has been evaluated at the Environmental Engineering and Science Laboratories of the University of Cincinnati. In this embodiment, the permeate side of the porous wall 11 is packed with a highly porous aggregate of polyethylene beads to prevent the collapse of the porous wall under the effects of hydrostatic pressure. Flux of treated water through the permeable porous wall collector can be controlled through manipulation of the differential water head between the biologically active compartment 12 and the product water side 13. This can be achieved by using level sensors on the permeate side 11 that activate a discharge valve. Level sensors on the biological side of the membrane ensure that the bacteria behind the membrane do not overflow out of the reactor, so that in the case of an event that slows water flux through the membrane, feed to the reactor is stopped when the level of fluid on the biological side reaches the cutoff sensor level. The sensor on the permeate side serves to control the gravity head between the two sides of the porous wall, thus controlling the flux of treated water through the permeable wall. Flow of water into the biologically active side 12 is controllable using another level sensor that permits entry of raw water into the tank at 14. The flux of water through the permeable wall can be increased or decreased by increasing or decreasing the differential between the two level controllers. Alternative methods of level and flow control can be used, such as computer controlled flow meters that ensure that cumulative influent flow does not exceed cumulative effluent flow.

In one situation, automated level controls can be used for treating water flows that exhibit fluctuations by adjusting the head differential between the biological and the product sides based on influent flow rate. Thus, this differential would be increased as the water flow increases, and vice versa.

FIG. 2 illustrates another embodiment of the gravity-flow biomass concentrator reactor 20 of the present invention. This configuration is designed for use in treatment systems handling larger flows than in FIG. 1, such as flows exceeding 0.5 million gallons per day. In this embodiment, individual modules of permeable wall material 21 are placed into the reactor so that they can be lifted and removed for cleaning purposes. All modules are connected via a lateral connection header 22 that allows discharge of treated water 23 in similar fashion to the smaller configuration.

It may be necessary to clean the permeable wall modules periodically. This can be effected either by in situ brushing or, in extreme cases, by removal of the module from the aeration tank and soaking the module in a dilute nitric acid solution.

The process can be used in either aerobic conditions or anaerobic conditions to treat water or wastewater. The process and apparatus of the present invention can remove, for example, MTBE from water to leave a residual concentration of about 1–4 micrograms per liter or less. Fluidized bed reactors, on the other hand, can only remove MTBE to a level of about 20 micrograms per liter. The process and apparatus are particularly useful for small communities because the treated water can be directly discharged to the ground without the need for treatment in a septic system.

Figure 3:
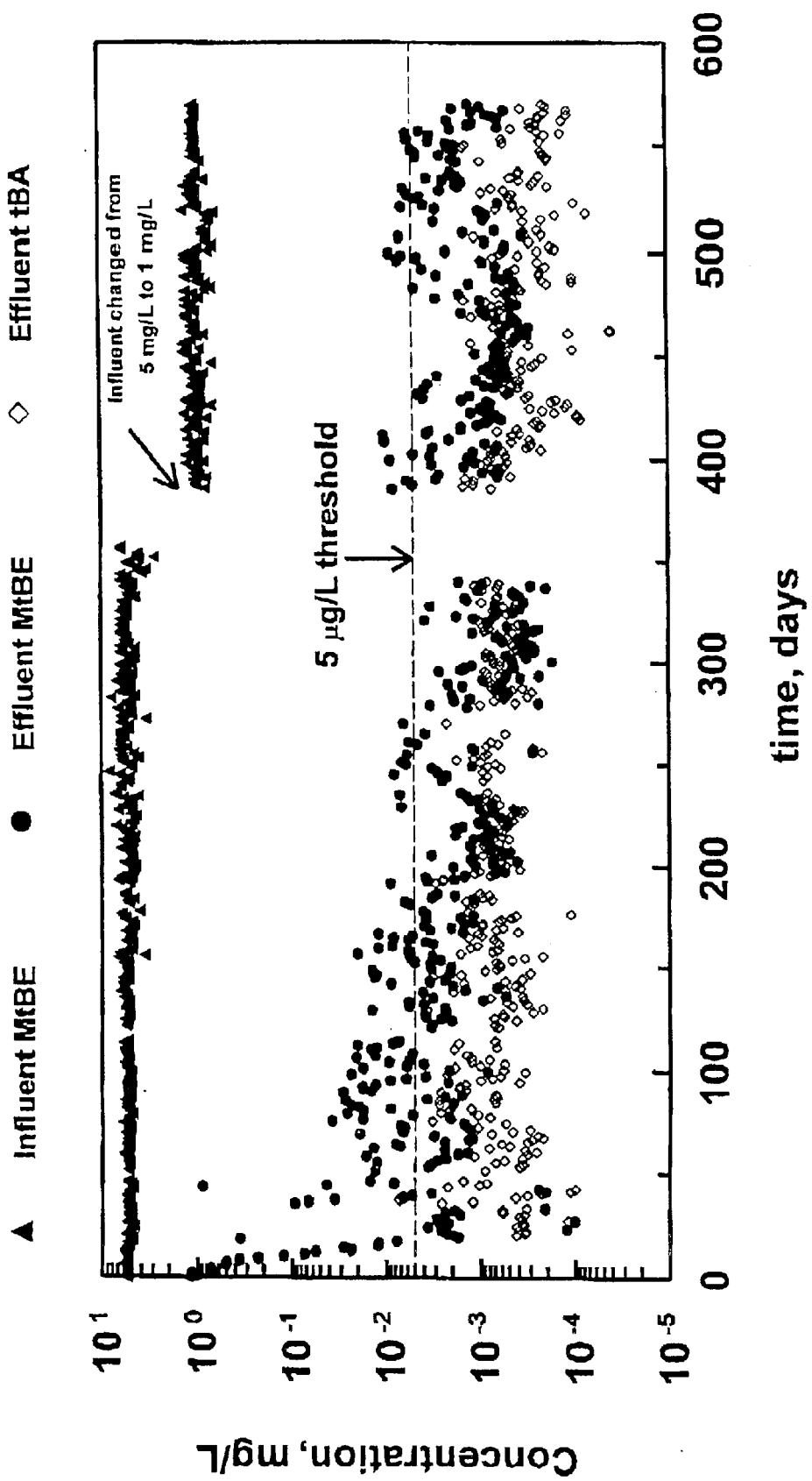
FIG. 3 shows performance of a biomass concentrator reactor treating water contaminated with HTBE over 570 days of operation.

FIG. 3 shows influent MTBE concentration at the top (triangles), which was 5 mg/L for the first 330 days of operation. After that, the concentration in the influent was dropped to 1 mg/L with no decrease in performance. The plot is logarithmic, so that it can readily be appreciated how consistent was the performance of the BCR of the present invention over the course of the operation. The horizontal dotted line signifies the threshold or action level desired to be achieved. The black dots are the effluent MtBE concentrations. The gray diamonds are the tBA concentrations. Clearly, achievement of the 5 micrograms/L level occurred nearly 100% of the time, except early on during the acclimation phase. It should be noted that many data points are far below the 5 microgram/L level.

Figure 4:
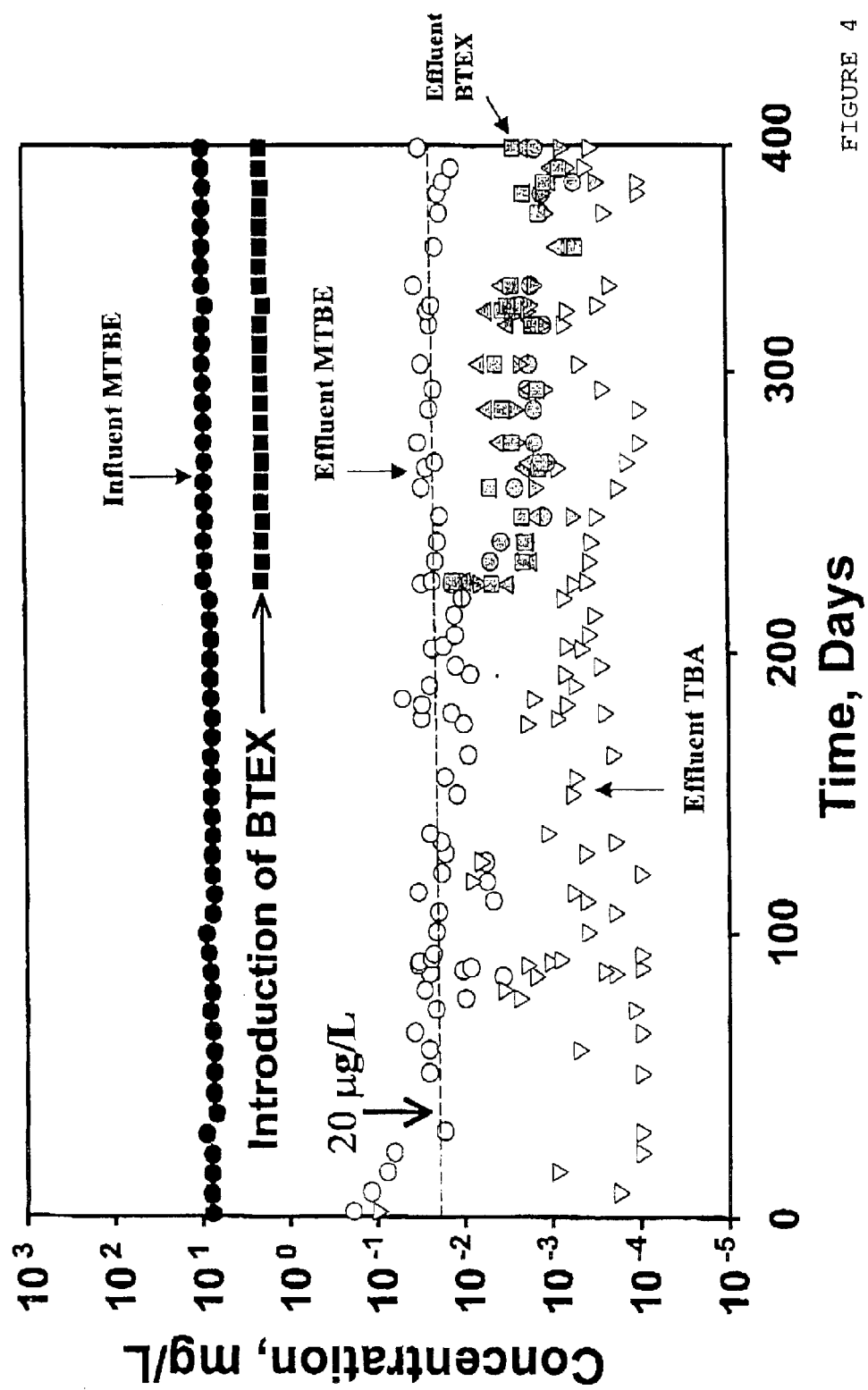
FIG. 4 shows performance of a fluidized bed reactor treating water contaminated with HTBE over 400 days of operation.

FIG. 4 illustrates how well a reactor other than the BCR of the present invention performed over a period of 400 days of operation. The FBR reactor, an aerobic fluidized bed granular activated carbon reactor, is a conventional reactor commonly used for treating groundwater contaminated with MTBE and BTEX. Although its performance was satisfactory, the best it could achieve was only 20 micrograms/L MtBE in the effluent. BTEX compounds (benzene, toluene, ethylbenzene, and xylene) were reduced to acceptably low levels in the FBR. The BCR is capable of minimizing the concentration of the BTEX compounds as well.

The foregoing description of the specific embodiments will so fully reveal the general nature of the invention that others can, by applying current knowledge, readily modify and/or adapt for various applications such specific embodiments without departing from the generic concept, and, therefore, such adaptions and modifications should and are intended to be comprehended within the meaning and range of equivalents of the disclosed embodiments. It is to be understood that the phraseology or terminology employed herein is for the purpose of description and not of limitation.

What is claimed is:

1. A gravity-flow biomass concentrator reactor comprising an intake for water to be treated, said intake leading into a housing enclosing at least one porous barrier having pore sizes such that water permeates through the porous barrier under the pressure of gravity, said porous barrier comprising an aggregate of polyethylene beads, and wherein substantially all suspended solids in the water are retained by the barrier, and an outflow from the housing through which treated water flows.

2. The gravity flow biomass reactor according to claim 1 wherein the porous barrier has pore sizes ranging from about 1 to about 50 microns.

3. The gravity-flow biomass concentrator reactor according to claim 1 wherein the at least one porous barrier comprises at least one individual removable module of permeable material.

4. The gravity-flow biomass concentrator reactor according to claim 1 wherein the at least one porous barrier has a fin design.

5. A method for treating water comprising introducing said water into a gravity-flow biomass concentrator reactor comprising an intake for water to be treated, said intake leading into a housing enclosing at least one removable porous barrier, the porous barrier having pore sizes which allow only the water to permeate through said at least one porous barrier under the pressure of gravity, said porous barrier comprising an aggregate of polyethylene beads; and collecting treated water from an outflow from the housing through which treated water flows, wherein substantially all suspended solids in the water are retained within the bioreactor chamber by the barrier.

6. The method according to claim 5 wherein the at least one porous barrier comprises a plurality of individual removable modules of permeable wall material.

7. The method according to claim 5 wherein the method is conducted under aerobic conditions.

8. The method according to claim 5 wherein the method is conducted under anaerobic conditions.

9. The method according to claim 5 wherein the water to be treated is groundwater or surface water with the product water destined for direct human consumption.

10. The method according to claim 5 wherein the water is wastewater.

11. The method according to claim 5 wherein the water is water from industrial waste.

12. The method according to claim 5 wherein the at least one porous barrier has pore sizes ranging from about 1 to about 50 microns.

* * * * *